United States Patent [19]

Nakamura et al.

[11] Patent Number: 4,670,322

[45] Date of Patent: * Jun. 2, 1987

[54] METAL OXIDE MAGNETIC SUBSTANCE AND A MAGNETIC FILM CONSISTING THEREOF AND THEIR USES

[75] Inventors: Hitoshi Nakamura, Numazu; Hazime Machida, Tokyo; Motoharu Tanaka, Numazu; Atsuyuki Watada, Numazu; Fumiya Omi, Numazu; Nobuyuki Koinuma, Yokohama, all of Japan

[73] Assignee: Ricoh Company, Ltd., Tokyo, Japan

[ * ] Notice: The portion of the term of this patent subsequent to Dec. 31, 2002 has been disclaimed.

[21] Appl. No.: 676,007

[22] Filed: Nov. 29, 1984

[30] Foreign Application Priority Data

| Dec. 5, 1983 [JP] | Japan | 58-229656 |
| Dec. 12, 1983 [JP] | Japan | 58-233906 |
| Jan. 12, 1984 [JP] | Japan | 59-4147 |
| Jan. 18, 1984 [JP] | Japan | 59-6595 |
| Feb. 3, 1984 [JP] | Japan | 59-19238 |
| Feb. 6, 1984 [JP] | Japan | 59-19675 |

[51] Int. Cl.$^4$ .................................................. G11B 7/24
[52] U.S. Cl. .................................. 428/172; 428/213; 428/214; 428/215; 428/332; 428/336; 428/457; 428/694; 428/702; 428/900
[58] Field of Search .............. 428/694, 695, 900, 702, 428/332, 172, 457, 161, 213–215, 336; 369/288, 13; 360/131, 134; 365/122

[56] References Cited

U.S. PATENT DOCUMENTS

| 3,638,207 | 1/1972 | Smith et al. ............... 252/62.58 |
| 3,770,639 | 11/1973 | Okazaki et al. ............ 252/62.58 |

FOREIGN PATENT DOCUMENTS

| 3413086 | 11/1984 | Fed. Rep. of Germany. |
| 24834 | 11/1966 | Japan .................... 252/62.58 |
| 23677 | 8/1969 | Japan .................... 252/62.58 |
| 38919 | 9/1970 | Japan .................... 252/62.58 |
| 2225 | 1/1983 | Japan. |
| 2002338 | 2/1979 | United Kingdom ............. 428/692 |

Primary Examiner—George F. Lesmes
Assistant Examiner—William M. Atkinson
Attorney, Agent, or Firm—Cooper, Dunham, Griffin & Moran

[57] ABSTRACT

The present invention provides a metal oxide magnetic substance represented by the general formula I:

$$MeO \cdot n[Al_X M_Y Fe_{2-x-(m/3)Y} O_3]$$

(wherein, Me is at least one member of Ba, Sr and Pb, M is at least one member of Zn, Sc, In, Cr, Ir, Ru, Rh, Ti, Ta, Sn and Ge, $5 \leq n \leq 6$, $0 < X \leq 0.8$, $0 < Y \leq 0.6$, and m is the ionic valency of M), a magnetic film consisting thereof, and a magneto optical recording medium and a perpendicular magnetic recording medium having the magnetic film.

21 Claims, 61 Drawing Figures

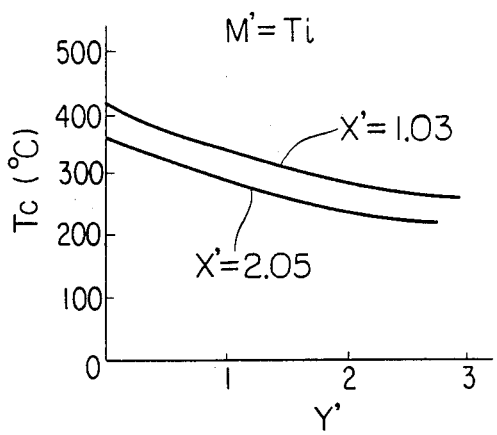
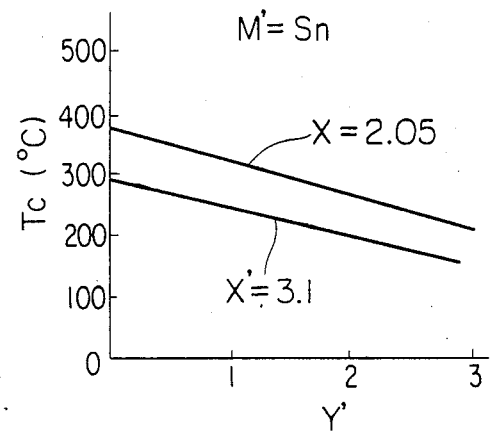
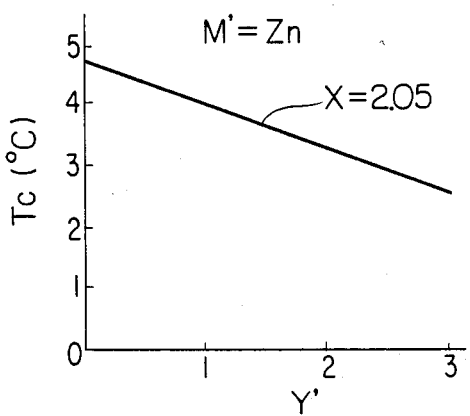
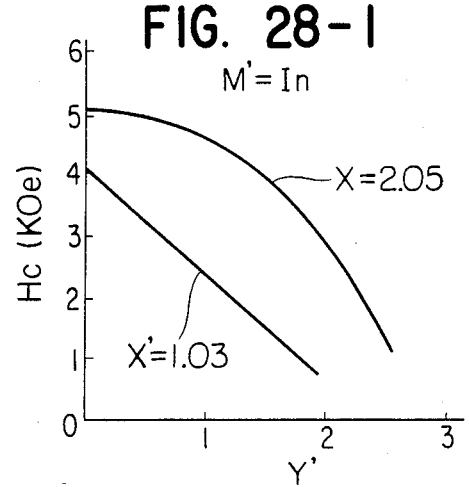
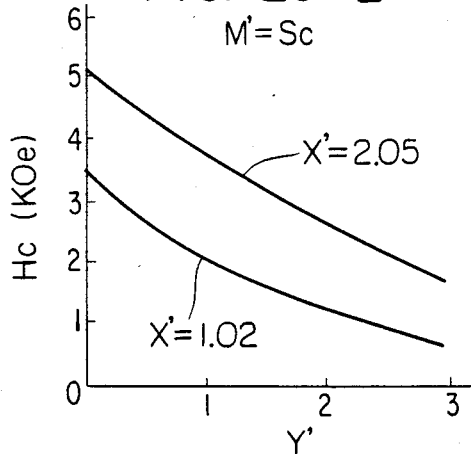
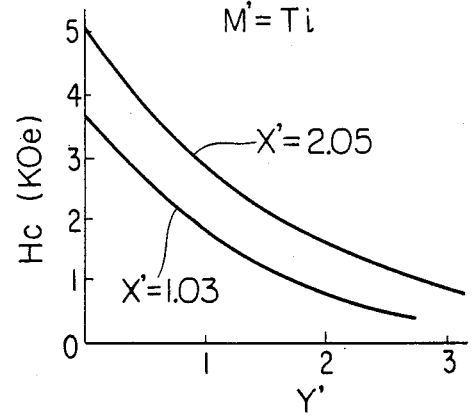

METAL OXIDE MAGNETIC SUBSTANCE AND A MAGNETIC FILM CONSISTING THEREOF AND THEIR USES

BACKGROUND OF THE INVENTION

1. Field of the Invention

The present invention relates to a novel metal oxide magnetic substance, a magnetic film consisting thereof, and their uses as magneto optical recording medium and perpendicular magnetic recording medium.

2. Prior Art

In recent years, magneto optical recording mediums designed to carry out magnetic recording by the use of semi-conductor laser beam have been studied and developed so as to be used for high density recording purposes. Usually, the magnetic substances used in magneto optical recording mediums were mostly occupied by those consisting of amorphous alloys made of rare earth metals and transition metals. The preparation of magneto optical recording mediums using such amorphous alloy magnetic substances was carried out generally in the manner of adhering said magnetic substance, for instance Tb-Fe alloy, on a substrate such as glass plate by vaccum vapordeposition, sputtering or the like in the degree of about 0.1-1 μm in thickness to form a magnetic film. The thus obtained magneto optical recording medium is recorded and regenerated as mentioned below. That is, recording is carried out in the manner of radiating the laser beam modulated with a divalent signal, making use of the rapid variation characteristic of a coercive force corresponding to the temperature variation in the neighborhood of the Curie temperature or compensation temperature of the magnetic film, on the magnetic film and heating same, thus inverting the direction of magnetization. Regeneration is carried out by reading out making use of the difference in magneto optical effects of the thus inversion-recorded magnetic film. The photomagnetic recording material using aforesaid amorphous alloy magnetic substance is advantageous in that it can be recorded at high speed (frequency=1 MHz) by means of a semiconductor laser beam because it is of a high recording sensitivity, but is heavily disadvantageous in that the magneto optical characteristic of the magnetic film deteriorates with a lapse of time because the amorphous alloy magnetic substance, in particular the rare earth metal component, is subject to oxidizing corrosion. In order to prevent this, it is known to provide a protective layer consisting of an oxide such as SiO, $SiO_2$ or a nitride such as TiN, $Si_3N_4$ on an amorphous magnetic film by means of vacuum vapordeposition, sputtering or the like as in the preparation of the magnetic film, but this is inadvantageous in that at the time of preparing the magnetic film or the protective layer, the magnetic film is oxidized and corroded by $O_2$ remaining in the vacuum, $O_2$, $H_2O$ or the like adsorbed to the surface of the substrate, and $O_2$, $H_2O$ or the like contained in the target consisting of the alloy magnetic substance with a lapse of time and pinholes are occurred, and further the oxidizing corrosion is enhanced by the light and heat at the time of recording. Further, the amorphous magnetic substance is disadvantageous in that it is liable to be crystalized by heat and therefore its magnetic characteristic is liable to be deteriorated. Still further, the reflection type Faraday system which comprises thickening the magnetic film as much as possible, providing a reflective film of Cu, Al, Pt, Au or the like thereon, radiating the laser beam on the magnetic film and permeating it therethrough, thereafter reflecting said beam from the magnetic film at the reflective film, and detecting this reflected beam has been proposed as the regeneration system for enhancing the regeneration output. The Faraday system is surely profitable in that a high S/N signal can be obtained, but the conventional amorphous magnetic film could not be used in this system because said magnetic film is inferior in transmittancy.

SUMMARY OF THE INVENTION

A primary object of the present invention is to provide a novel metal oxide magnetic substance which has high recording sensitivity, is superior in oxidizing corrosion resistance and is especially suitable as a material for preparing a magneto optical recording medium; a magnetic film consisting of this metal oxide magnetic substance; and a magneto optical recording medium having said magnetic film on a substrate.

A secondary object of the present invention is to provide a perpendicular magnetic recording medium which comprises providing a magnetic film consisting of said magnetic metal oxide magnetic substance on a substrate.

The metal oxide magnetic substance according to the present invention is the one represented by the general formula I:

$$MeO.n[Al_X M_Y Fe_{2-X-(m/3)Y} O_3] \qquad (I)$$

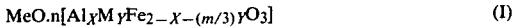

(wherein, Me is at least one member of Ba, Sr and Pb, M is at least one member of Zn, Sc, In, Cr, Ir, Ru, Rh, Ti, Ta, Sn and Ge, $5 \leq n \leq 6$, $0 < X \leq 0.8$, $0 < Y \leq 0.6$, and m is an ionic valency of M), the magnetic film according to the present invention comprises the metal oxide magnetic substances represented by said general formula I, and the magneto optical recording medium and the perpendicular magnetic recording medium according to the present invention are each the one having said magnetic film on a substrate.

In this connection, it is to be noted these metal oxide magnetic substances represented by the general formulas I may be added with metals such as Ni, Cu, Sb, Bi, Co, Mo, Nb, Pd, Mn, Yb, V, Te, Zr, Tc, Pt, Os, Re, W and the like in order to improve magneto optical effect or to regulate coercive force or ionic valency (regarding to the regulation of ionic valency, when a divalent metal or a tetravalent metal is used as M, a tetravalent metal or a divalent metal is preferably added respectively).

DESCRIPTION OF THE INVENTION

The magnetic substance or magnetic film used in the magneto optical recording medium is required to have the magneto optical characteristics (proper Curie temperature, coercive force and the like) which permit the recording and regeneration using a semiconductor laser beam, and must have a low Curie temperature Tc in order to obtain a high recording sensitivity and a properly high coercive Hc in order to maintain a recorded memory stably. Generally speaking, the proper range of Tc is considered to be 100°–400° C., and the proper range of Hc is considered to be 200–6000 oersted. The reason is that when Tc is less than 100° C., the recorded memory becomes unstable due to the laser beam at the time of regeneration which leads to the reason for deteriorating the regeneration characteristic and when Tc is more than 400° C., the recording using the laser beam becomes difficult, whilst when Hc is less than 200 oersted, it is possible that the memory becomes unstable and dissipates and when Hc is more than 6000 oersted, the laser output and the outside magnetic field required for magnetic inversion at the time of recording become undesirably large.

On the other hand, hexagonal and spinel metal oxide magnetic substances have hitherto been studied as the magnetic bubble materials. As the hexagonal metal oxide magnetic substance there is known the M type ferrite represented by for instance the general formula II:

$$MeO \cdot n[Fe_2O_3] \tag{II}$$

(wherein, Me and n are the same as defined in the general formula I). We paid attention to the fact that since the magnetic substance of this sort is itself oxide, there is no peril of being deteriorated by oxidation and that even when the film thickness is increased to 10μ, said substance still holds permeability. However, said magnetic substance is disadvantageous in that since the Curie temperature Tc is high (450° C. or more), it makes the recording using the semiconductor laser beam as described previously still more difficult, and so it itself can not be applied as the material for magneto optical recording medium. In view of this, we have carried out various investigations to find that when part of the Fe atoms in the general formula II is substituted by Al or said M metal, Tc is lowered in each case of substitution by Al or said M metal. At the same time, we found that in the case of Al substitution the coercive force Hc increases and in the case of M metal substitution Hc decreases. For instance, in the general formula II, the cases of (1) Al or In-substituted compound where Me=Ba:- $BaFe_{12-(l/3)x}M'_xO_{19}$ (M' stands for Al or In, Z stands for the substitution number of Al or In and l stands for ionic valency of Al or In.), (2) Al or Ti-substituted compound where Me=Ba:- $BaFe_{12-(l/3)x}M'_xO_{19}$ (M' stands for Al or Ti, Z stands for the substitution number of Al or Ti and l stands for ionic valency of Al or Ti.), (3) Al or Sc-substituted compound where Me=Ba:- $BaFe_{12-(l/3)x}M'_xO_{19}$ (M' stands for Al or Sc, Z stands for the substitution number of Al or Sc and l stands for ionic valency of Al or Sc.), (4) Al or Zn-substituted compound where Me=Ba:- $BaFe_{12-(l/3)x}M'_xO_{19}$ (M' stands for Al or Zn, Z stands for the substitution number of Al or Zn and l stands for ionic valency of Al or Zn.), (5) Al or Sn-substituted compound where Me=Ba:- $BaFe_{12-(l/3)x}M'_xO_{19}$ (M' stands for Al or Sn, Z stands for the substitution number of Al or Sn and l stands for ionic valency of Al or Sn.), (6) Al, Sc, Ti, Sn or Zn-substituted compound where Me=Ba and Sr:$Ba_{0.75}Sr_{0.25}Fe_{12-(l/3)x}M'_xO_{19}$ (M' stands for Al, Sc, Ti, Sn or Zn, Z stands for the substitution number of Al, Sc, Ti, Sn or Zn and l stands for ionic valency of Al, Sc, Ti, Sn or Zn.), and (7) Al, In, Sc, Ti, Sn or Zn-substituted compound where Me=Pb:$PbFe_{12-(l/3)x}M'_xO_{19}$ (M' stands for Al, In, Sc, Ti, Sn or Zn, Z stands for the substitution number of Al, In, Sc, Ti, Sn or Zn and l stands for ionic valency of Al, In, Sc, Ti, Sn or Zn.), denoted the tendency as shown in FIG. 1, FIG. 2, FIG. 3, FIG. 4, FIG. 5, FIG. 6-1-4 and FIG. 7-1-5 with reference to Tc, and denoted the tendency as shown in FIG. 8, FIG. 9, FIG. 10, FIG. 11, FIG. 12, FIG. 13-1-4 and FIG. 14-1-5 with reference to Hc respectively. Therefore, while paying attention to the substitution effects of Al and M' metal and further taking account of the aforesaid proper ranges of Tc and Hc, we have substituted part of Fe in the metal oxide represented by the general formula II by using two kinds of metals consisting of Al and at least one member of said M in various percentages to find the fact that the metal oxide magnetic substances represented by the general formula I achieve superior characteristics as the magneto optical recording mediums. Based on this finding, the present invention was accomplished.

As is evident from the aforegoing, the present invention has made the metal oxide of the general formula II applicable as the material for magneto optical recording medium by substituting part of Fe atoms in the metal oxide of the general formula II, which was not regarded as the material for use in magneto optical recording medium due to its high Curie temperature, by Al and M metal so that the Curie temperature may be lowered while maintaining coercive force at a suitably high degree required for the memory and thus the metal oxide of the general formula II may be recorded and regenerated by the semi-conductor laser beam.

In other words, the metal oxide magnetic substance according to the present invention satisfies the proper Curie temperature range and the proper coercive force range required for the magneto optical recording medium material.

For instance, in the case of (8) $BaAl_{X'}In_{Y'}Fe_{12-X'-(l/3)Y'}O_{19}$ (wherein, X' stands for the substitution number of Al and Y' stands for the substitution number of In)

corresponding to the preceding formula (1), Tc is 180° C. when the substitution number X' of Al is 2.05 and the substitution number Y' of In is 2.0 as shown in FIG. 15, and Hc is about 2.9K oersted when the substitution number X' of Al is 2.05 and the substitution number Y' of In is 2.0 as shown in FIG. 16. In the case of (9) $BaAl_{X'}Ti_{Y'}Fe_{12-X'-(l/3)Y'}O_{19}$ (wherein, X' stands for the substitution number of Al and Y' stands for the substitution number of Ti)

corresponding to the preceding formula (2), Tc is 260° C. when the substitution number X' of Al is 2.05 and the substitution number Y' of Ti is 2.00 as shown in FIG. 17, and Hc is about 3.6K oersted when the substitution number X' of Al is 2.05 and the substitution number Y' of Ti is 2.00 as shown in FIG. 18. In the case of

(10) $BaAl_{X'}Sc_{Y'}Fe_{12-X'-(l/3)Y'}O_{19}$ (wherein, X' stands for the substitution number of Al and Y' stands for the substitution number of Sc)

corresponding to the preceding formula (3), Tc is 250° C. when the substitution number X' of Al is 2.05 and the substitution number Y' of Sc is 2.00 as shown in FIG. 19 and Hc is about 3.6K oersted when the substitution number X' of Al is 2.05 and the substitution number Y' of Sc is 2.00 as shown in FIG. 20. In the case of

(11) $BaAl_{X'}Zn_{Y'}Fe_{12-X'-(l/3)Y'}O_{19}$ (wherein, X' stands for the substitution number of Al and Y' stands for the substitution number of Zn)

corresponding to the preceding formula (4), Tc is 218° C. when the substitution number X' of Al is 2.05 and the substitution number Y' of Zn is 2.5 as shown in FIG. 21 and Hc is about 3.9K oersted when the substitution number X' of Al is 2.05 and the substitution number Y' of Zn is 2.5 as shown in FIG. 22. In the case of

(12) $BaAl_{X'}Sn_{Y'}Fe_{12-X'-(l/3)Y'}O_{19}$ (wherein, X' stands for the substitution number of Al and Y' stands for the substitution number of Sn)

corresponding to the preceding formula (5), Tc is 200° C. when the substitution number X' of Al is 3.1 and the substitution number Y' of Sn is 1.7 as shown in FIG. 23, and Hc is about 1.8K oersted when the substitution number X' of Al is 3.1 and the substitution number Y' of Sn is 1.7 as shown in FIG. 24. In the case of

(13) $Ba_{0.75}Sr_{0.25}Al_{X'}M'_{Y'}Fe_{12-X'-(l/3)Y'}O_{19}$ (wherein, M' stands for In, Sc, Ti or Sn, X' stands for the substitution number of Al, Y' stands for the substitution number of In, Sc, Ti or Sn and l is as defined previously)

corresponding to the preceding formula (6), Tc is 180° C. when the substitution number X' of Al is 2.05 and the substitution number Y' of In is 2.0 as shown in FIG. 25-1, and the same tendency can be observed when M'=Sc, Ti and Sn (which see FIG. 25-2, FIG. 25-3 and FIG. 25-4 respectively). Referring to Hc where M'=In, it is 2.9K oersted when the substitution number X' of Al is 2.05 and the substitution number Y' of In is 2.0 as shown in FIG. 26-1, and the same tendency can be observed when M'=Sc, Ti and Sn (which see FIG. 26-2, FIG. 26-3 and FIG. 26-4 respectively). In the case of

(14) $PbAl_{X'}M'_{Y'}Fe_{12-X'-(l/3)Y'}O_{19}$ (wherein, M' stands for In, Sc, Ti, Sn or Zn, X' stands for the substitution number of Al, and Y' stands for the substitution number of In, Sc, Ti, Sn or Zn)

corresponding to the preceding formula (7), where M'=In, Tc is 180° C. when the substitution number X' of Al is 2.05 and the substitution number Y' of In is 2.0 as shown in FIG. 27-1, and the same tendency can be observed when M'=Sc, Ti, Sn or Zn (which see FIG. 27-2, FIG. 27-3, FIG. 27-4 and FIG. 27-5 respectively). Referring to Hc where M'=In, it is 2.9K oersted when the substitution number X' of Al is 2.05 and the substitution number Y' is 2.0 as shown in FIG. 28-1, and the same tendency can be observed when M'=Sc, Ti, Sn or Zn (which see FIG. 28-2, FIG. 28-3, FIG. 28-4 and FIG. 28-5 respectively).

The metal oxide magnetic substance according to the present invention can be prepared through the steps of mixing and pulverizing at least one member of $BaCO_3$, $SrCO_3$ and $PbCO_3$ with $Fe_2O_3$, $Al_2O_3$ and at least one member of said M metal oxide and, if necessary, at least one member of said additional metals, each being in a predetermined quantity; calcinating same at a temperature of 1000°–1100° C.; thereafter pulverizing same again; placing the thus pulverized one in a proper-shaped mold for press-molding; and thereafter calcinating it at a temperature of 1200°–1400° C.

Concrete examples of the metal oxide magnetic substances obtained as mentioned above will be given as follows.

Metal oxide magnetic substance according to the formula I:
$BaO.5[Al_{0.2}In_{0.3}Fe_{1.5}O_3]$
$BaO.6[Al_{0.2}In_{0.3}Fe_{1.5}O_3]$
$BaO.6[Al_{0.25}In_{0.32}Fe_{1.23}O_3]$
$BaO.5.6[Al_{0.1}In_{0.3}Fe_{1.6}O_3]$
$SrO.5[Al_{0.2}In_{0.3}Fe_{1.5}O_3]$
$SrO.6[Al_{0.2}In_{0.3}Fe_{1.5}O_3]$
$SrO.6[Al_{0.25}In_{0.3}Fe_{1.45}O_3]$
$SrO.5.6[Al_{0.1}In_{0.3}Fe_{1.6}O_3]$
$BaO.6[Al_{0.3}Ti_{0.21}Fe_{1.42}O_3]$
$BaO.6[Al_{0.2}Ti_{0.06}Zn_{0.12}Fe_{1.64}O_3]$
$SrO.6[Al_{0.2}Ti_{0.12}Zn_{0.24}Fe_{1.48}O_3]$
$SrO.5.9[Al_{0.3}Ti_{0.12}Fe_{1.54}O_3]$
$BaO.5.2[Al_{0.2}Sc_{0.2}Fe_{1.6}O_3]$
$BaO.5.4[Al_{0.1}Sc_{0.2}Fe_{1.7}O_3]$
$BaO.5.4[Al_{0.2}Sc_{0.1}Fe_{1.7}O_3]$
$BaO.5.4[Al_{0.2}Sc_{0.2}Fe_{1.6}O_3]$
$BaO.5.6[Al_{0.3}Sc_{0.2}Fe_{1.5}O_3]$
$BaO.5.6[Al_{0.2}Sc_{0.3}Fe_{1.5}O_3]$
$BaO.5.6[Al_{0.4}Sc_{0.2}Fe_{1.3}O_3]$
$BaO.5.8[Al_{0.4}Sc_{0.1}Fe_{1.5}O_3]$
$SrO.5.5[Al_{0.3}Sc_{0.2}Fe_{1.5}O_3]$
$SrO.5.5[Al_{0.3}Sc_{0.1}Fe_{1.6}O_3]$
$BaO.5.2[Al_{0.2}Zn_{0.3}Fe_{1.6}O_3]$
$BaO.5.4[Al_{0.1}Zn_{0.12}Ir_{0.06}Fe_{1.74}O_3]$
$BaO.5.4[Al_{0.3}Zn_{0.3}Fe_{1.5}O_3]$
$BaO.5.6[Al_{0.2}Zn_{0.12}Ta_{0.06}Fe_{1.64}O_3]$
$BaO.5.6[Al_{0.3}Zn_{0.12}Rh_{0.06}Fe_{1.54}O_3]$
$SrO.5.2[Al_{0.2}Zn_{0.45}Fe_{1.5}O_3]$
$SrO.5.6[Al_{0.3}Zn_{0.24}Ti_{0.12}Fe_{1.38}O_3]$
$BaO.6[Al_{0.3}Sn_{0.12}Fe_{1.54}O_3]$
$BaO.5.8[Al_{0.2}Sn_{0.21}Fe_{1.52}O_3]$
$SrO.5.6[Al_{0.3}Rh_{0.24}Fe_{1.46}O_3]$
$PbO.5.6[Al_{0.2}Sn_{0.24}Fe_{1.48}O_3]$
$BaO.5.6[Al_{0.2}Cr_{0.12}Fe_{1.68}O_3]$
$BaO.5.7[Al_{0.3}Rh_{0.1}Fe_{1.6}O_3]$
$BaO.5.2[Al_{0.2}Cr_{0.2}Fe_{1.6}O_3]$
$BaO.5.5[Al_{0.12}Rh_{0.2}Fe_{1.68}O_3]$
$SrO.5.7[Al_{0.3}Rh_{0.1}Fe_{1.6}O_3]$
$SrO.5.7[Al_{0.2}Cr_{0.2}Fe_{1.6}O_3]$
$PbO.5.5[Al_{0.2}Rh_{0.1}Fe_{1.7}O_3]$
$PbO.5.7[Al_{0.2}Ru_{0.2}Fe_{1.64}O_3]$
$Ba_{0.75}Sr_{0.25}O.6[Al_{0.35}In_{0.15}Fe_{1.5}O_3]$
$Ba_{0.75}Sr_{0.25}O.6[Al_{0.35}Ti_{0.15}Fe_{1.45}O_3]$
$Ba_{0.75}Sr_{0.25}O.6[Al_{0.35}Sc_{0.15}Fe_{1.5}O_3]$
$Ba_{0.75}Sr_{0.25}O.6[Al_{0.2}Zn_{0.24}Sn_{0.12}Fe_{1.48}O_3]$
$Ba_{0.75}Sr_{0.25}O.6[Al_{0.3}Zn_{0.12}Ti_{0.06}Fe_{1.54}O_3]$
$PbO.6[Al_{0.2}In_{0.1}Fe_{1.7}O_3]$
$PbO.6[Al_{0.3}Ti_{0.15}Fe_{1.5}O_3]$
$PbO.6[Al_{0.3}Sc_{0.1}Fe_{1.6}O_3]$
$PbO.6[Al_{0.3}Zn_{0.21}Fe_{1.56}O_3]$
$PbO.6[Al_{0.3}Zn_{0.12}Sn_{0.06}Fe_{1.54}O_3]$
$PbO.5.5[Al_{0.3}In_{0.2}Fe_{1.5}O_3]$
$PbO.5.5[Al_{0.2}Ti_{0.18}Fe_{1.56}O_3]$
$PbO.5.8[Al_{0.3}Sc_{0.1}Fe_{1.6}O_3]$
$PbO.5.8[Al_{0.2}Zn_{0.21}Fe_{1.66}O_3]$
$BaO.6[Al_{0.2}Ir_{0.1}Fe_{1.7}O_3]$
$BaO.6[Al_{0.2}Ta_{0.12}Fe_{1.64}O_3]$
$BaO.6[Al_{0.2}Ge_{0.12}Fe_{1.64}O_3]$ Metal oxide magnetic substance according to the formula I, containing said additional metals:
$BaO.5.6[Al_{0.2}Ti_{0.06}Co_{0.12}Fe_{1.64}O_3]$
$BaO.5.5[Al_{0.2}Ti_{0.12}Co_{0.24}Fe_{1.48}O_3]$
$SrO.5.5[Al_{0.3}Ti_{0.06}Cu_{0.12}Fe_{1.54}O_3]$
$SrO.5.7[Al_{0.2}Ti_{0.06}Ni_{0.12}Fe_{1.64}O_3]$
$BaO.5.6[Al_{0.4}Zn_{0.12}Os_{0.06}Fe_{1.44}O_3]$
$BaO.5.8[Al_{0.2}Zn_{0.12}Pt_{0.06}Fe_{1.54}O_3]$
$SrO.5.8[Al_{0.2}Zn_{0.24}W_{0.06}Fe_{1.64}O_3]$
$BaO.6[Al_{0.35}Sn_{0.06}Ni_{0.012}Fe_{1.49}O_3]$
$BaO.5.6[Al_{0.2}Zn_{0.24}Mn_{0.12}Fe_{1.48}O_3]$
$SrO.5.7[Al_{0.2}Ti_{0.06}Co_{0.12}Fe_{1.64}O_3]$
$SrO.5.6[Al_{0.2}Zn_{0.12}Mn_{0.06}Fe_{1.64}O_3]$
$PbO.6[Al_{0.2}Ir_{0.06}Cu_{0.12}Fe_{1.64}O_3]$
$PbO.5.6[Al_{0.2}Ge_{0.06}Ni_{0.12}Fe_{1.64}O_3]$
$PbO.5.8[Al_{0.2}Zn_{0.12}V_{0.06}Fe_{1.64}O_3]$ When intending to prepare the magnetic film using our metal oxide magnetic substance, although depending on the kind of the substrate, it is generally be prepared by adhering this magnetic substance onto the substrate so that the film thickness may be in the range of about 0.1–10 μm, with a substrate temperature of 400°–800° C. as a target and by means of vacuum vapordeposition, sputtering, ion-plating or the like. Thus, there can be obtained a magneto optical recording medium having a vertical magnetic anisotropy-magnetic film 2 or a substrate 1. In this instance, the magnetic film may be formed at a substrate temperature of not more than 400° C. as occasion demands. In this instance, however, there is the necessity of heat-treating the thus formed magnetic film at a temperature of 400°–800° C., while impressing the magnetic field as the case may be, for vertical magnetization. The substrate materials used herein generally include heat-resisting metals such as aluminum and the like; qartz glass; gallium-garnet-gadolinium; saphire; lithium tantalate; crystallized transparent glass; Pyrex glass; Vycor glass; aluminosilicate glass; surface oxidation-treated or untreated single crystal silicon; transparent ceramic materials such as $Al_2O_3$, $Al_2O_3.MgO$, $MgO.LiF$, $Y_2O_3.LiF$, BeO, $ZrO_2.Y_2O_3$, $ThO_2.CaO$ and the like; inorganic materials such as inorganic silicon materials (Goods on the market, for instance such as "Tosguard" produced by Toshiba Silicone Co. and "Sumiceram P" produced by Sumitomo Kagaku Co.) and the like; opaque ceramic materials such as $Al_2O_3$, $ZrO_2$, AlN; metals such as Al, steel, stainless steel; and heat-resisting organic resin materials such as polyamide resin, polyimide resin, polyether sulfone and the like.

The magnetic film according to the present invention is applicable to not only the monolayer type magneto optical recording medium as shown in FIG. 29 but also all well known multilayer type magneto optical recording mediums. As these multilayer type ones, there can be enumerated those constructed as shown in FIGS. 30–33. In the drawing, reference numeral 1' denotes a substrate equipped with a guide track, 3 denotes a reflective film, 4 denotes a transparent dielectric layer, 5 denotes a guide track layer, 6 denotes a protective film, 7 denotes a transparent adhesive layer and 8 denotes a heat-resisting layer. The substrate equipped with a guide track 1' may be prepared by processing the above mentioned organic material by virtue of injection molding, extrusion molding, photoetching process or the like. The guide track of the substrate acts to guide the laser beam at the time of recording and regeneration. The reflective film 3 can be formed by adhering Cu, Al, Ag, Au, Cr, Rh, Ni, Pt, $TeO_x$, TeC, SeAs, TeAs, TiN, TaN, CrN, cyanine dye, phthalocyanine dye, methine dye or the like on a target surface by means of vacuum vapordeposition, sputtering, ion-plating or the like so that the film thickness may be about 500–10,000 Å. This reflective film is provided for the purpose of increasing Faraday effect caused by reflecting the laser beam having permeated through the magnetic film and permeating said laser beam through the magnetic film again. The transparent dielectric layer 4 is formed by adhering $SiO_2$, SiO, $TiO_2$, TiO, CeO, $HfO_2$, BeO, $ThO_2$, SiN, $Si_3N_4$, TiN or the like on a target surface by means of the above mentioned process so that the film thickness may be about 0.05–0.5 μm. This transparent dielectric layer is provided for the purpose of increasing Faraday's angle of rotation and enhancing regenerative output. The guide track layer 5 is formed by applying a ultraviolet ray-curing resin onto a target surface, thereafter radiating the ultraviolet ray thereto while press-attaching a guide grooved mold, and curing said resin. The protective layer 6 is formed by adhering acrylic resin, polyurethane resin, polycarbonate resin, polyether sulfone resin, polyamide resin, epoxy resin, TiN, SiN, $Si_3N_4$, TaN, CrN, AlN, $SiO_2$, SiO, $TiO_2$ or the like on a target surface so that the resulting film thickness may be about 0.1–100 μm, by means of a coating process in the case of the resin and by means of vacuum vapordeposition, sputtering, ion-plating or the like in the other case. This protective layer is provided for the purpose of protecting the surface layer, i.e. the reflective film 3 in this case. The transparent adhesive layer 7 is formed by adhering the reflective film of the substrate 1' with a guide track provided with the reflective film 3 and the magnetic film of the heat-resisting layer 8 provided with the magnetic film 2 (said heat-resiting layer 8 comprises said inorganic material, and therefore "the heat-resisting layer provided with the magnetic film" corresponds to aforesaid monolayer type magneto optical recording medium.) using epoxy resin, polyurethane resin, polyamide resin or the like so as to have a thickness of about 0.1–10 μm. Accordingly, this transparent adhesive may be said to be a mere layer for connecting the reflective film 3 on the substrate 1' with the magnetic film 2 consisting of the monolayer type magneto optical recording medium. In this connection it is to be noted that the heat-resisting layer 8, which is consisted of the aforesaid inorganic material, corresponds to the substrate 1, but is provided herein for the purpose of enhancing the heat-resisting property of the magnetic film 2. The suitable thickness thereof is about 0.1–2 mm.

The protective film 6 may be provided not only at the surface of the recording medium shown in FIG. 32 but also at the surface of the recording media shown in FIGS. 29–31 and 33. In order to improve the vertical magnetic anisotropic property of the magnetic film, furthermore, there may be used the substrates treated with ZnO, $\alpha$-$Fe_2O_3$, $\alpha$-$Al_2O_3$, AlN, $SiO_2$, MgO, MnZn-ferrite or the like.

The above mentioned magneto optical recording medium using the magnetic film according to the present invention is subjected to recording and regeneration in the manner of radiating a modulated or deflected laser beam from the side of the magnetic film or substrate as usually done.

The metal oxide substance or magnetic film according to the present invention has proper Tc and Hc required for the magneto optical recording medium material and is of a high recording sensitivity. In spite of this, it has the oxidizing corrosion resistance and transparency which could not be observed in the usual one, and therefore is free from deterioration in the magneto optical characteristics with a lapse of time and can use a transmitted light on regeneration. Thus, regeneration can be effected in the manner of making use of Faraday's angle of rotation which is high in regenerative output. Still further, the metal oxide magnetic substance or magnetic film according to the present invention can be used also in the perpendicular magnetic recording medium (which structure is basically identical with that of said monolayer type magneto optical recording medium). In this instance, however, as the preferable metal oxide magnetic substances there are enumerated those being low in the metal substitution numbers X and Y, in particular those satisfying $0 < X \leq 0.2$ and $0 < Y \leq 0.2$ in the formula I.

Figure 1:
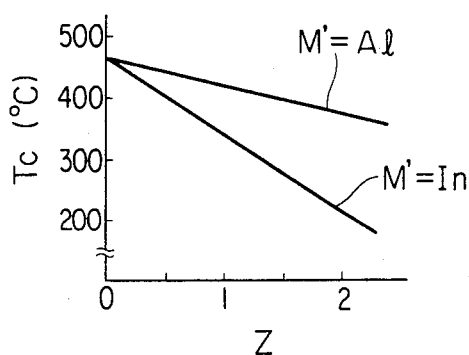
FIG. 1, FIG. 2, FIG. 3, FIG. 4, FIG. 5, FIGS. 6-1–6-4 and FIGS. 7-1–7-5 are each a relational diagram between the substitution number Z of M' and the Curie temperature Tc in each of the following metal oxide magnetic substances.
Figure 2:
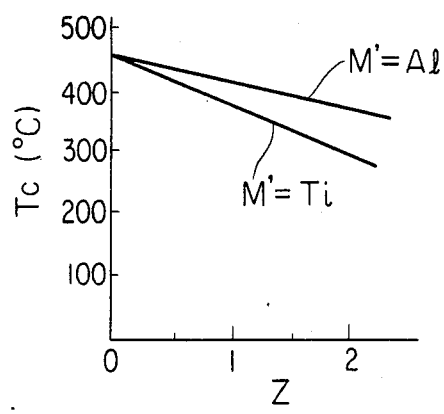
Figure 3:
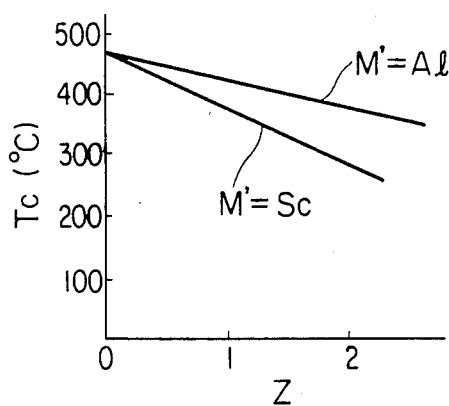
Figure 4:
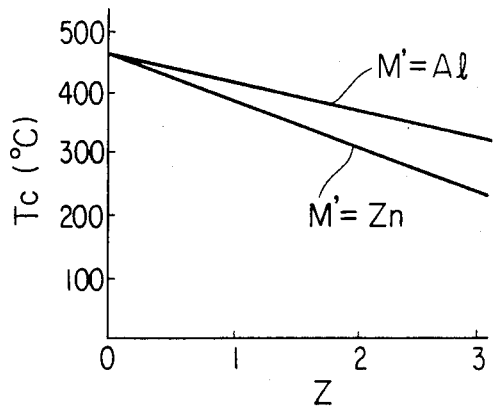
Figure 5:
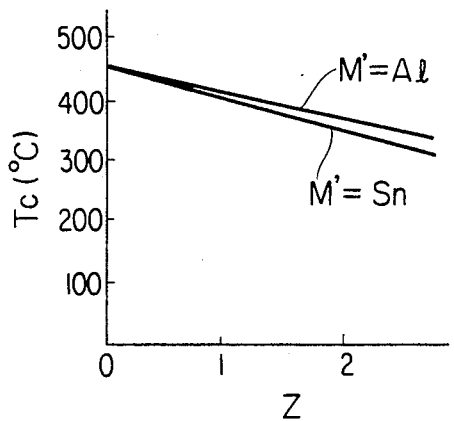
Figures 1, 6:
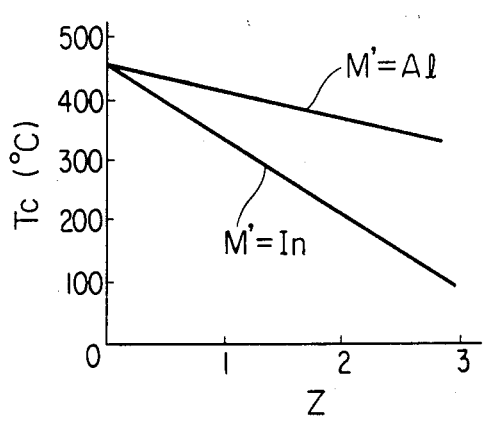
Figures 2, 6:
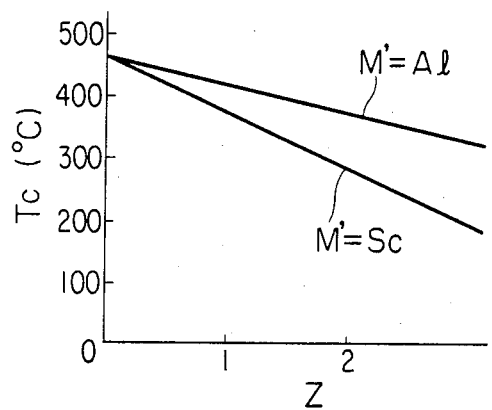
Figures 3, 6:
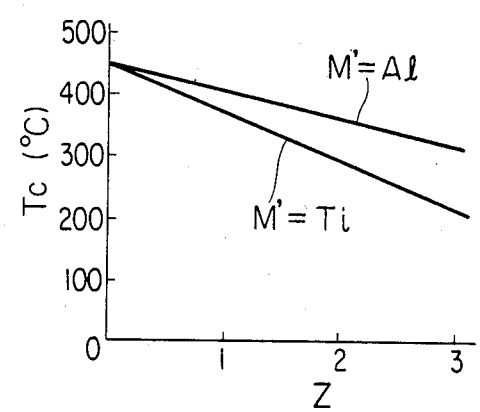
Figures 4, 6:
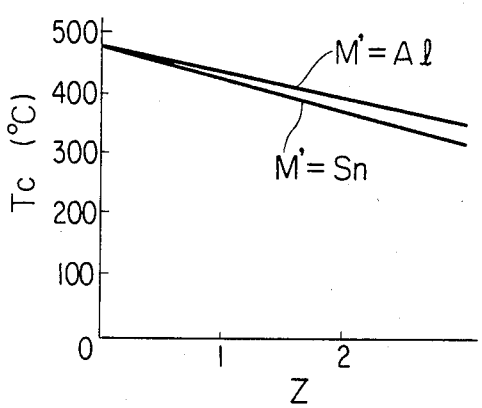
Figures 1, 7:
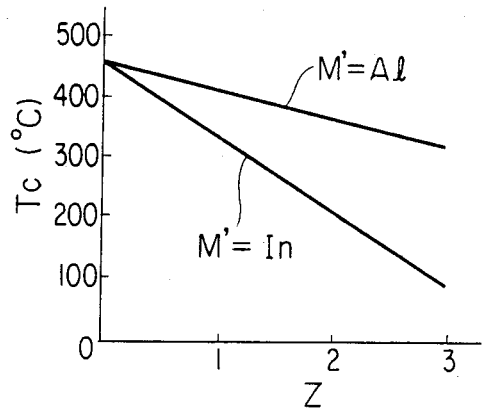
Figures 2, 7:
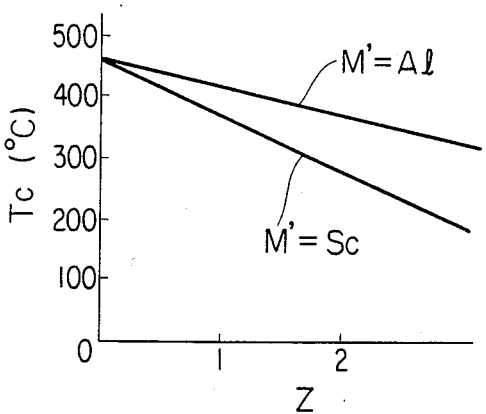
Figures 3, 7:
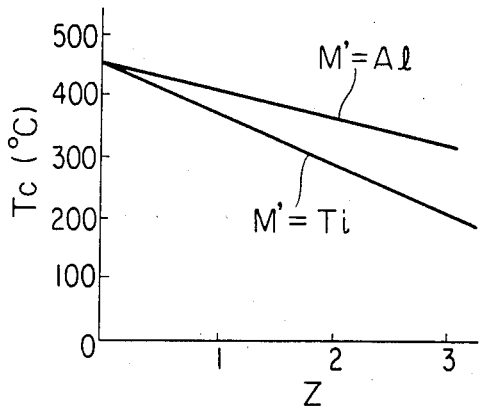
Figures 4, 7:
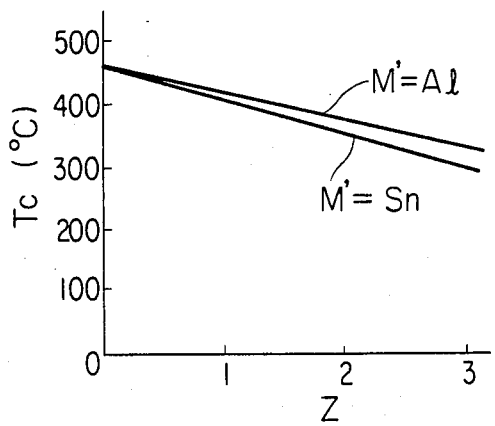
Figures 5, 7:
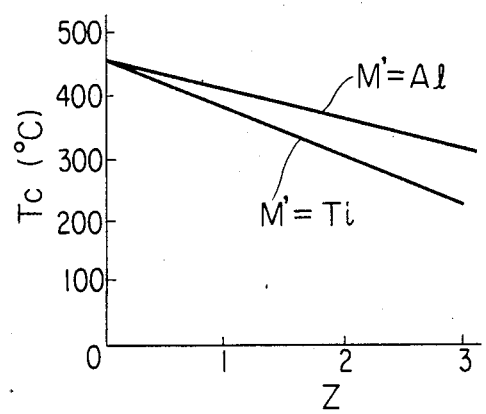
Figure 8:
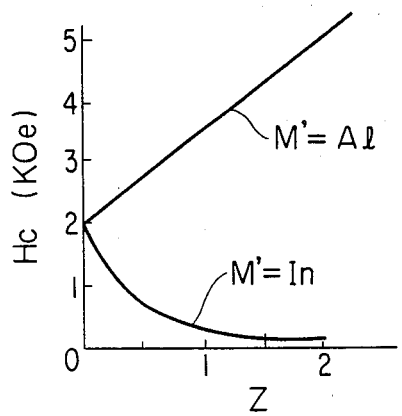
Figure 9:
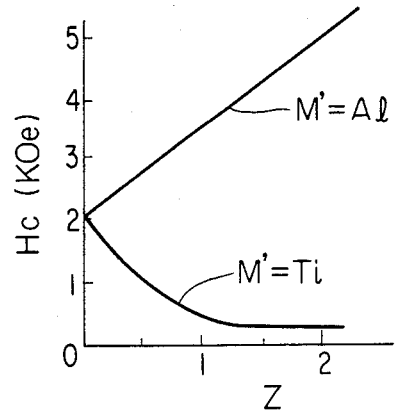
Figure 10:
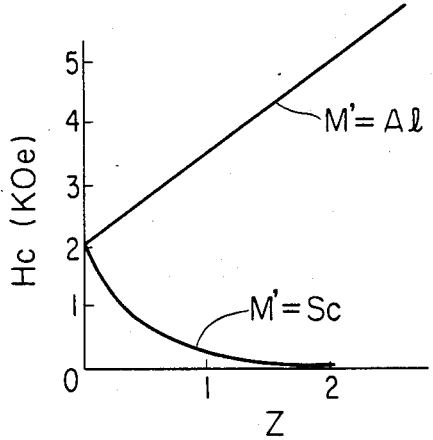
Figure 11:
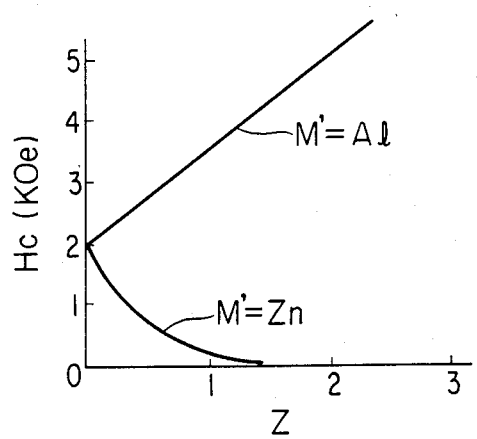
Figure 12:
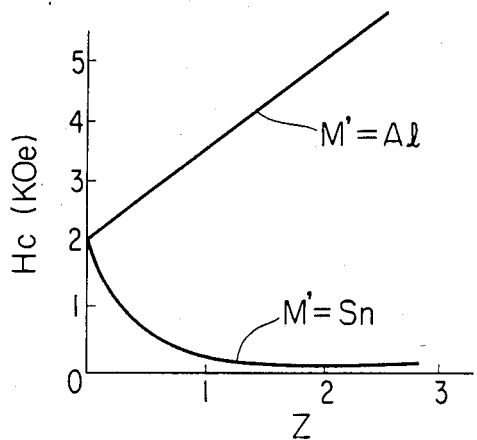
Figures 1, 13:
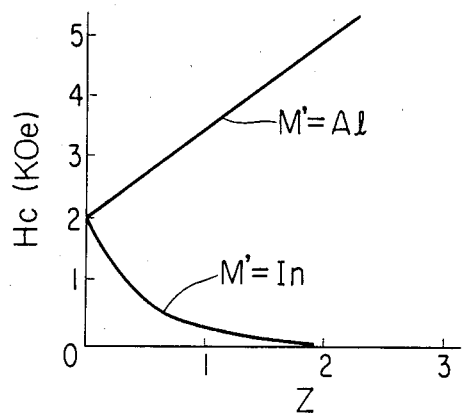
Figures 2, 13:
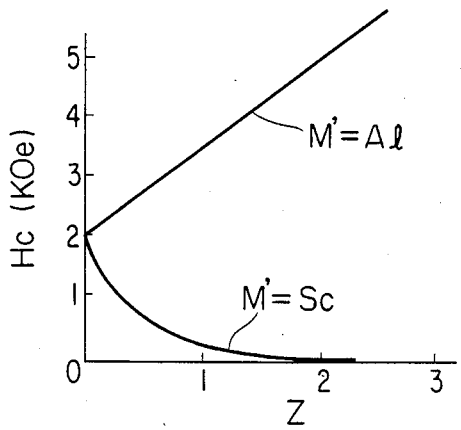
Figures 3, 13:
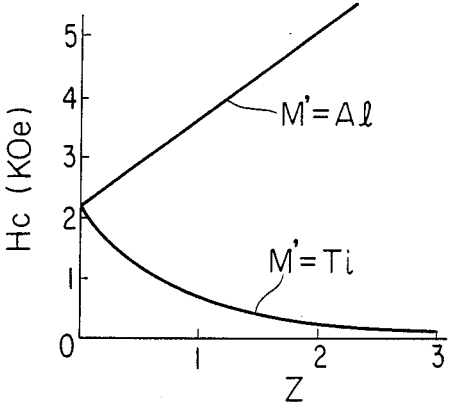
Figures 4, 13:
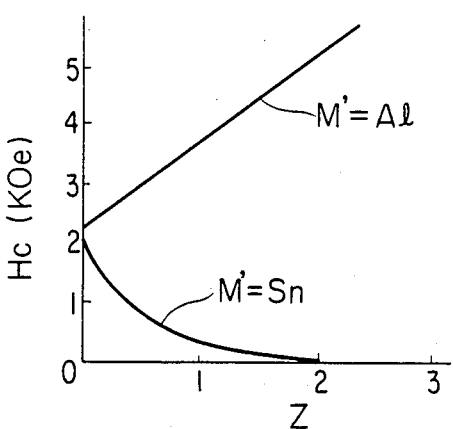
Figures 1, 14:
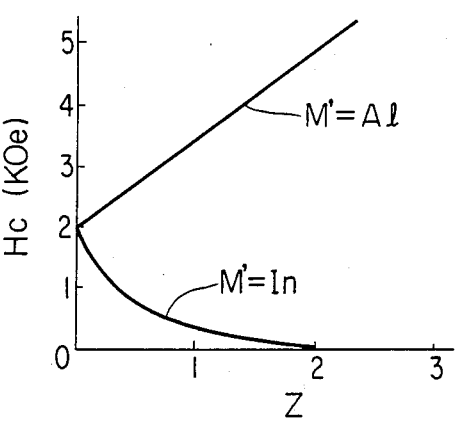
Figures 2, 14:
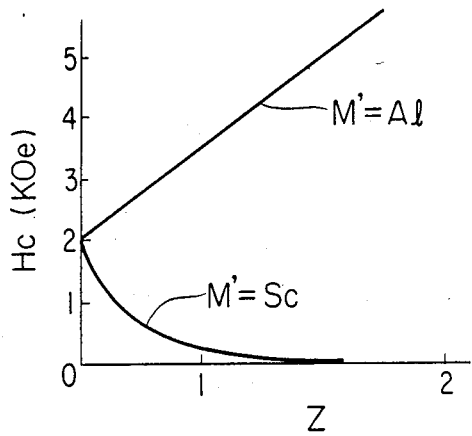
Figures 3, 14:
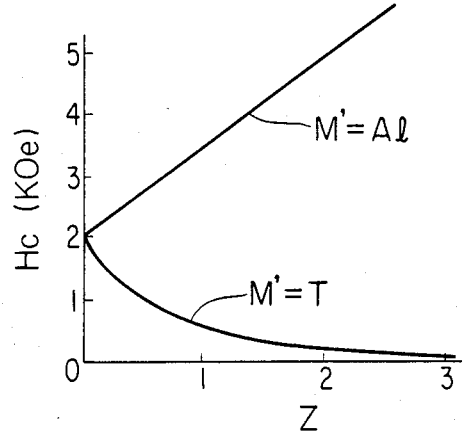
Figures 4, 14:
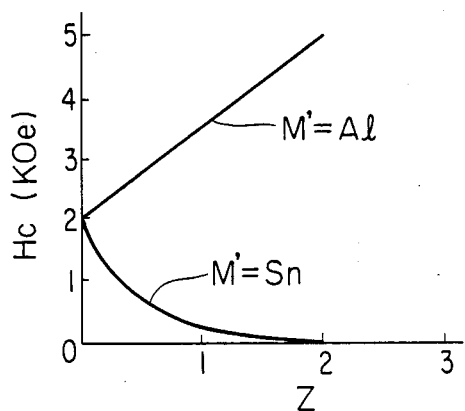
Figures 5, 14:
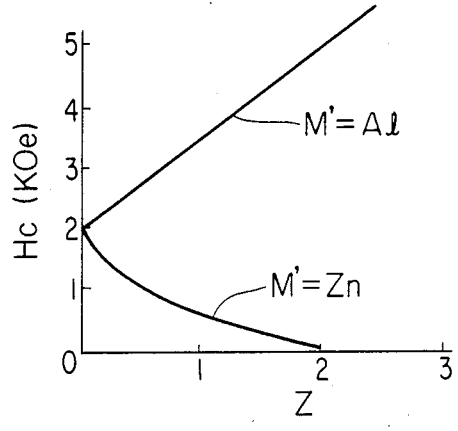
Figure 15:
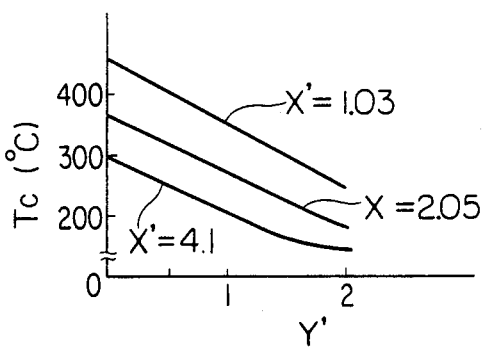
Figure 16:
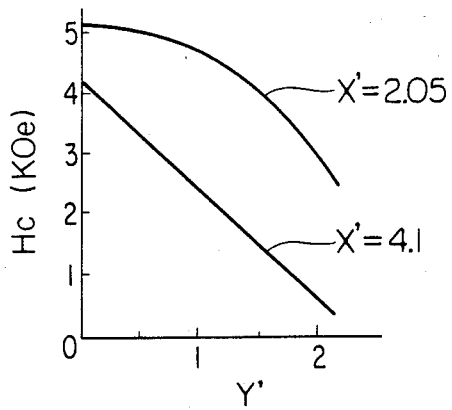
Figure 17:
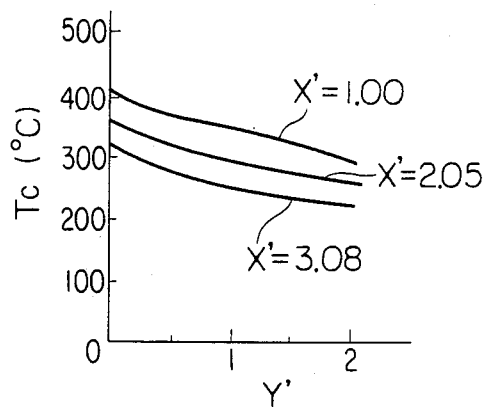
Figure 18:
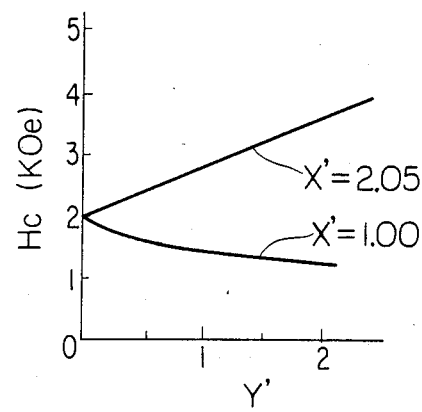
Figure 19:
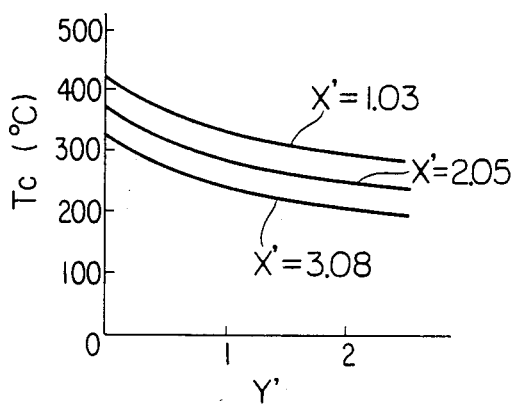
Figure 20:
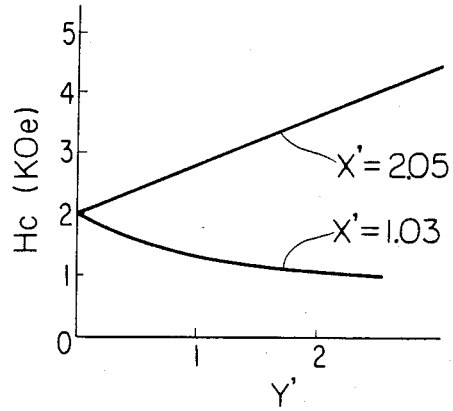
Figure 21:
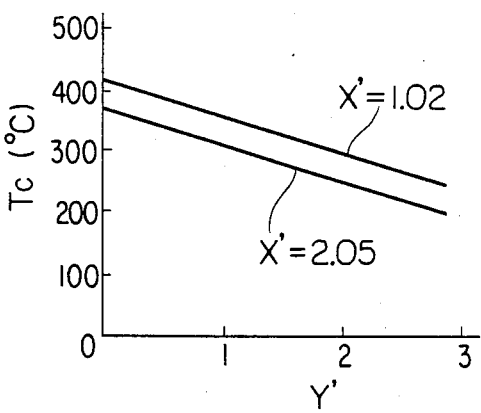
Figure 22:
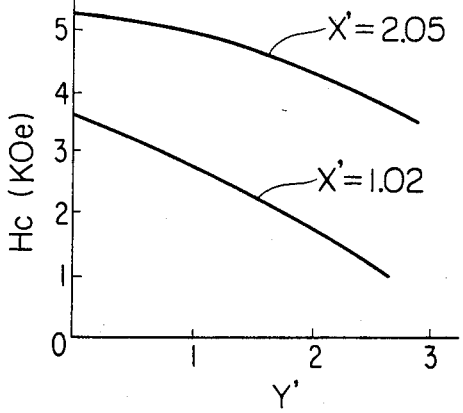
Figure 23:
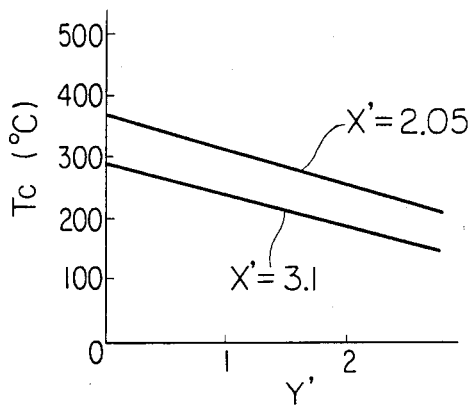
Figure 24:
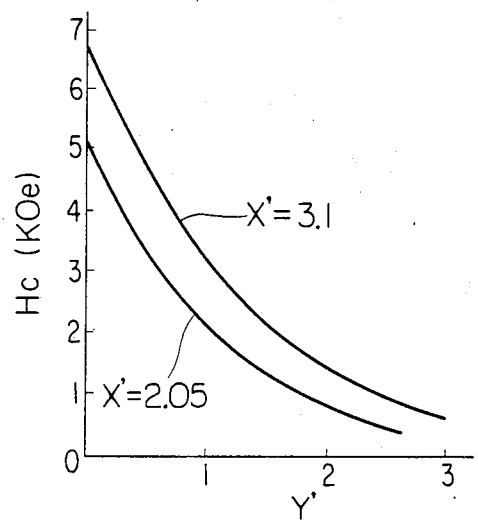
Figures 1, 25:
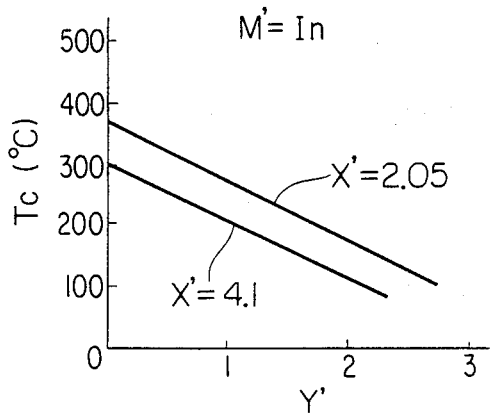
Figures 2, 25:
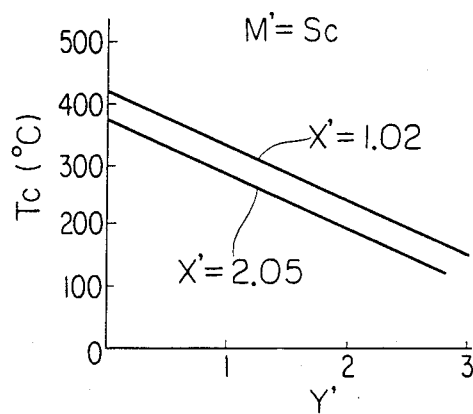
Figures 3, 25:
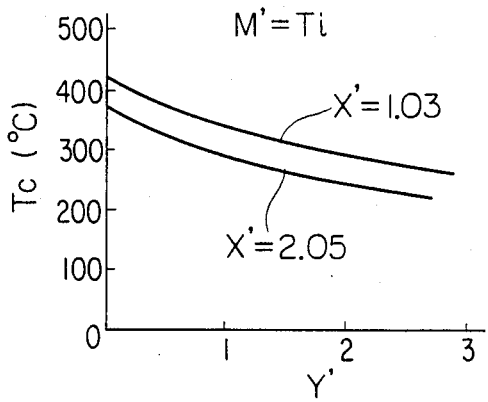
Figures 4, 25:
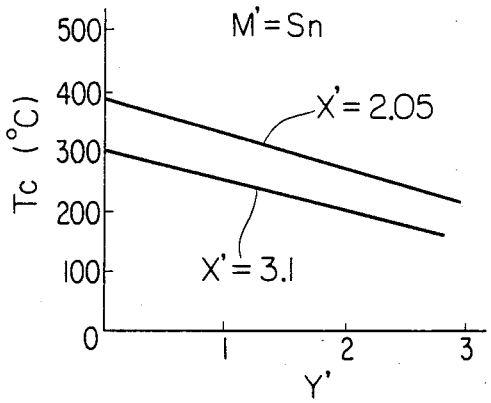
Figures 1, 26:
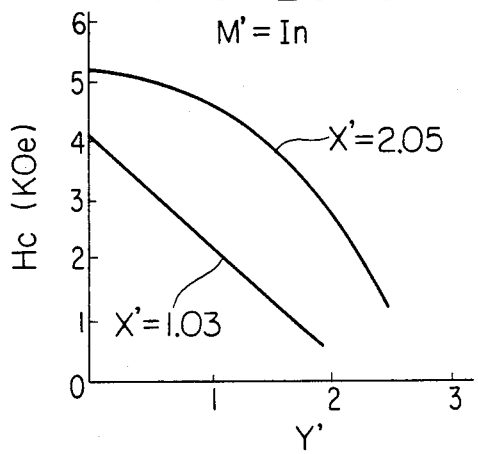
Figures 2, 26:
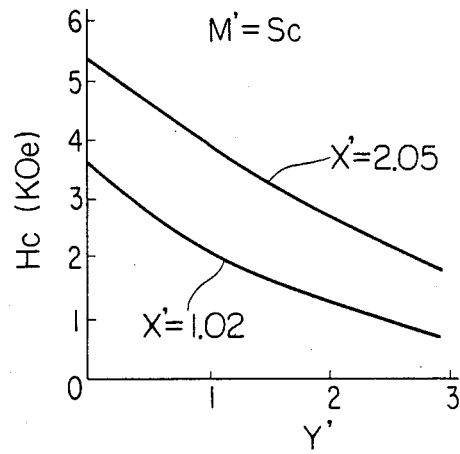
Figures 3, 26:
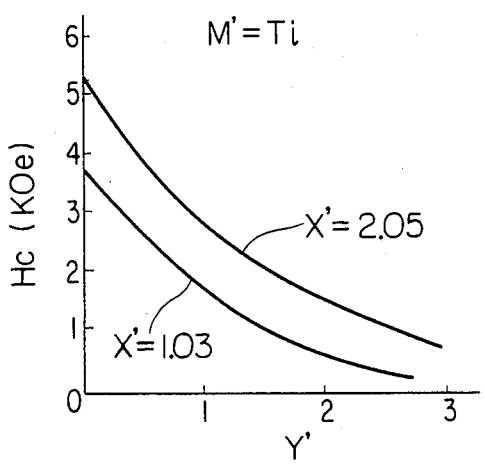
Figures 4, 26:
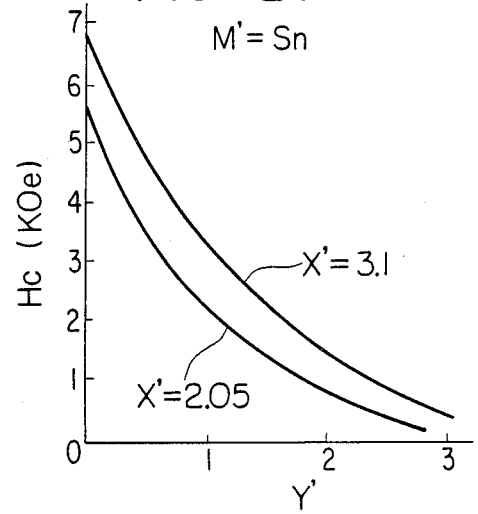
Figures 1, 27:
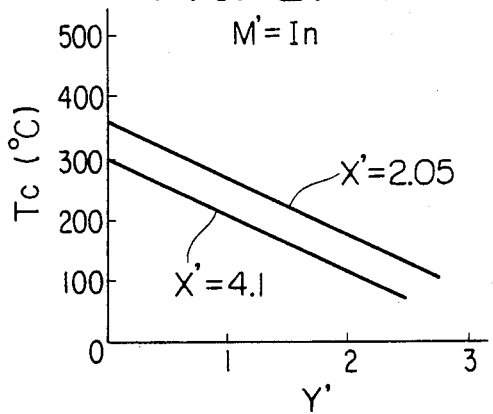
Figures 2, 27:
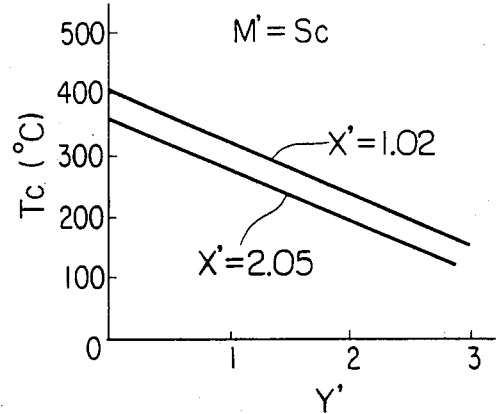
Figures 4, 28:
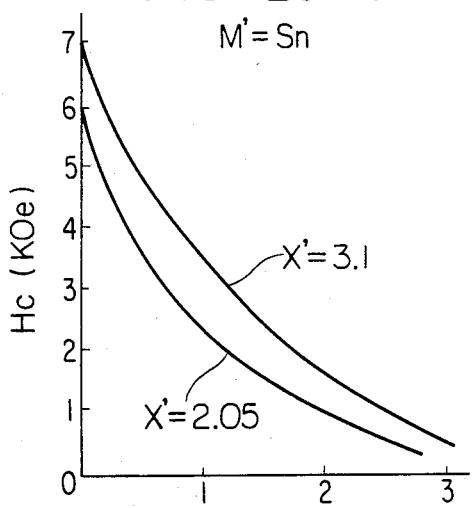
Figures 5, 28:
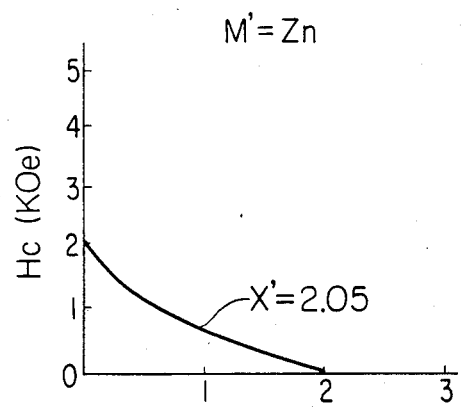
Figure 29:
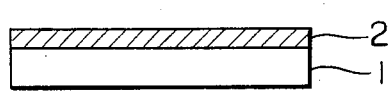
Figure 30:
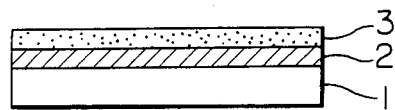
Figure 31:
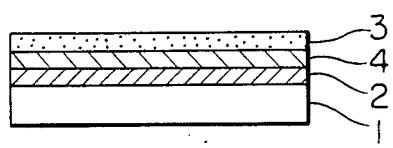
Figure 32:
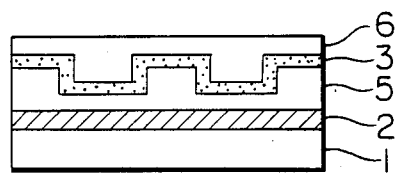
Figure 33:
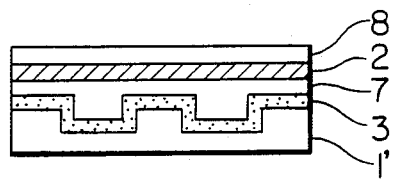

(1) $BaFe_{12-(l/3)Z}M_Z'O_{19}$ (wherein, M' stands for Al or In, Z stands for the substitution number of M', and l stands for the ionic valency of M'), (2) $BaFe_{12-(l/3)Z}M_Z'O_{19}$ (wherein, M' stands for Al or Ti, Z stands for the substitution number of M', and l stands for the ionic valency of M'), (3) $BaFe_{12-(l/3)Z}M_Z'O_{19}$ (wherein, M' stands for Al or Sc, Z stands for the substitution number of M', and l stands for the ionic valency of M'), (4) $BaFe_{12-(l/3)Z}M_Z'O_{19}$ (wherein, M' stands for Al or Zn, Z stands for the substitution number of M', and l stands for the ionic valency of M'), (5) $BaFe_{12-(l/3)Z}M_Z'O_{19}$ (wherein, M' stands for Al or Sn, Z stands for the substitution number of M', and l stands for the ionic valency of M'), (6) $Ba0.75Sr_{0.25}Fe_{12-(l/3)Z}M_Z'O_{19}$ (wherein, M' stands for Al, In, Sc, Ti, Sn or Zn, Z stands for the substitution number of M', and l stands for the ionic valency of M') and (7) $PbFe_{12-(l/3)Z}M_Z'O_{19}$ (wherein, M' stands for Al, In, Sc, Ti, Sn or Zn, Z stands for the substitution number of M', and l stands for the ionic valency of M');

FIG. 8, FIG. 9, FIG. 10, FIG. 11, FIG. 12, FIGS. 13-1–13-4 and FIGS. 14-1–14-5 are each a relational diagram between the substitution number of M' and the coercive force Hc of M' in each of said metal oxide magnetic substances: (1)-(7);

FIG. 15, FIG. 17, FIG. 19, FIG. 21, FIG. 23, FIGS. 25-1–25-4 and FIGS. 27-1–27-5 are each a relational diagram between the following Y' and the Curie temperature Tc in each of the following metal oxide magnetic materials:

(8) $BaAl_{X'}In_{Y'}Fe_{12-X'-(l/3)Y'}O_{19}$ (wherein, X' stands for the substitution number of Al, and Y' stands for the substitution number of In), (9) $BaAl_{X'}Ti_{Y'}Fe_{12-X'-(l/3)Y'}O_{19}$ (wherein, X' stands for the substitution number of Al and Y' stands for the substitution number of Ti),

(10) $BaAl_{X'}Sc_{Y'}Fe_{12-X'-(l/3)Y'}O_{19}$ (wherein, X' stands for the substitution number of Al and Y' stands for the substitution number of Sc),

(11) $BaAl_{X'}Zn_{Y'}Fe_{12-X'-(l/3)Y'}O_{19}$ (wherein, X' stands for the substitution number of Al and Y' stands for the substitution number of Zn),

(12) $BaAl_{X'}Sn_{Y'}Fe_{12-X'-(l/3)Y'}O_{19}$ (wherein, X' stands for the substitution number of Al and Y' stands for the substitution number of Sn),

(13) $Ba_{0.75}Sr_{0.25}Al_{X'}M'_{Y'}Fe_{12-X'-(l/3)Y'}O_{19}$ (wherein, M' stands for In, Sc, Ti, Sn or Zn, X' stands for the substitution number of Al and Y' stands for the substitution number of M') and (14) $PbAl_{X'}M'_{Y'}Fe_{12-X'-(l/3)Y'}O_{19}$ (wherein, M' stands for In, Sc, Ti, Sn or Zn, X' stands for the substitution number of Al and Y' stands for the substitution number of M');

FIG. 16, FIG. 18, FIG. 20, FIG. 22, FIG. 24, FIGS. 26-1–26-4 and FIGS. 28-1–28-5 are each a relational diagram between said Y' and the coercive force Hc in each of said metal oxide magnetic substances (8)-(14); and FIG. 29 to FIG. 33 are each a block diagram illustrating one example of the magneto optical recording medium using the magnetic substance or magnetic film according to the present invention.

1 ... substrate
1' ... substrate equipped with a guide track
2 ... magnetic film
3 ... reflective film
4 ... transparent dielectric layer
5 ... guide track layer
6 ... protective layer
7 ... transparent adhesive layer
8 ... heat-resisting layer

DESCRIPTION OF THE PREFERRED EMBODIMENTS

Examples of the present invention will be given as follows.

EXAMPLE 1

A quartz substrate, whose surface had been abrasion-treated optically, was subjected to 2 hours' sputtering the respective targets consisting of metal oxide magnetic substances shown in the following table under the conditions of Ar partial pressure: 2.0 mm Torr, $O_2$ partial pressure: 0.3 mm Torr, discharge electric power 0.35 KW and substrate temperature: 620° C. to thereby form 0.5 μm-thick magnetic films thereon. The results obtained by measuring these magnetic films with reference to Curie temperature Tc and coercive force Hc will be shown in the following table.

| Example No. | Composition of target | Tc (°C.) | Hc (Oersted) |
|---|---|---|---|
| 1 | $BaO.5[Al_{0.2}In_{0.3}Fe_{1.5}O_3]$ | 300 | 1500 |
| 2 | $BaO.6[Al_{0.2}In_{0.3}Fe_{1.5}O_3]$ | 290 | 1500 |
| 3 | $BaO.6[Al_{0.25}In_{0.32}Fe_{1.23}O_3]$ | 240 | 1500 |
| 4 | $BaO.5.6[Al_{0.1}In_{0.3}Fe_{1.6}O_3]$ | 330 | 1000 |
| 5 | $SrO.5[Al_{0.2}In_{0.3}Fe_{1.5}O_3]$ | 310 | 1500 |
| 6 | $SrO.6[Al_{0.2}In_{0.3}Fe_{1.5}O_3]$ | 310 | 1500 |
| 7 | $SrO.6[Al_{0.25}In_{0.3}Fe_{1.45}O_3]$ | 300 | 2000 |
| 8 | $SrO.5.6[Al_{0.1}In_{0.3}Fe_{1.6}O_3]$ | 340 | 1000 |
| 9 | $BaO.6[Al_{0.3}Ti_{0.21}Fe_{1.42}O_3]$ | 320 | 2000 |
| 10 | $BaO.5.6[Al_{0.2}Ti_{0.06}Co_{0.12}Fe_{1.64}O_3]$ | 370 | 1500 |
| 11 | $BaO.5.5[Al_{0.2}Ti_{0.12}Co_{0.24}Fe_{1.48}O_3]$ | 370 | 1500 |
| 12 | $BaO.6[Al_{0.2}Ti_{0.06}Zn_{0.12}Fe_{1.64}O_3]$ | 340 | 1000 |
| 13 | $SrO.6[Al_{0.2}Ti_{0.12}Zn_{0.24}Fe_{1.48}O_3]$ | 300 | 1000 |
| 14 | $SrO.5.5[Al_{0.3}Ti_{0.06}Cu_{0.12}Fe_{1.54}O_3]$ | 350 | 2000 |
| 15 | $SrO.5.7[Al_{0.2}Ti_{0.06}Ni_{0.12}Fe_{1.64}O_3]$ | 370 | 1000 |
| 16 | $SrO.5.9[Al_{0.3}Ti_{0.12}Fe_{1.54}O_3]$ | 350 | 1700 |
| 17 | $BaO.5.2[Al_{0.2}Sc_{0.2}Fe_{1.6}O_3]$ | 350 | 1500 |
| 18 | $BaO.5.4[Al_{0.1}Sc_{0.2}Fe_{1.7}O_3]$ | 370 | 1500 |
| 19 | $BaO.5.4[Al_{0.2}Sc_{0.1}Fe_{1.7}O_3]$ | 390 | 1700 |
| 20 | $BaO.5.4[Al_{0.2}Sc_{0.2}Fe_{1.6}O_3]$ | 350 | 1500 |
| 21 | $BaO.5.6[Al_{0.3}Sc_{0.2}Fe_{1.5}O_3]$ | 320 | 2200 |
| 22 | $BaO.5.6[Al_{0.2}Sc_{0.3}Fe_{1.5}O_3]$ | 300 | 1000 |
| 23 | $BaO.5.6[Al_{0.4}Sc_{0.2}Fe_{1.3}O_3]$ | 250 | 2400 |
| 24 | $BaO.5.8[Al_{0.4}Sc_{0.1}Fe_{1.5}O_3]$ | 330 | 2600 |
| 25 | $SrO.5.5[Al_{0.3}Sc_{0.2}Fe_{1.5}O_3]$ | 310 | 1900 |
| 26 | $SrO.5.5[Al_{0.3}Sc_{0.1}Fe_{1.6}O_3]$ | 350 | 2500 |
| 27 | $BaO.5.2[Al_{0.2}Zn_{0.3}Fe_{1.6}O_3]$ | 330 | 2000 |
| 28 | $BaO.5.4[Al_{0.1}Zn_{0.12}Ir_{0.06}Fe_{1.74}O_3]$ | 370 | 1500 |
| 29 | $BaO.5.4[Al_{0.3}Zn_{0.3}Fe_{1.5}O_3]$ | 300 | 3000 |
| 30 | $BaO.5.6[Al_{0.2}Zn_{0.12}Ta_{0.06}Fe_{1.64}O_3]$ | 300 | 1800 |
| 31 | $BaO.5.6[Al_{0.4}Zn_{0.12}Os_{0.06}Fe_{1.44}O_3]$ | 300 | 3000 |
| 32 | $BaO.5.6[Al_{0.3}Zn_{0.12}Rh_{0.06}Fe_{1.54}O_3]$ | 300 | 3200 |
| 33 | $BaO.5.8[Al_{0.2}Zn_{0.12}Pt_{0.06}Fe_{1.54}O_3]$ | 350 | 1800 |
| 34 | $SrO.5.2[Al_{0.2}Zn_{0.45}Fe_{1.5}O_3]$ | 290 | 2250 |
| 35 | $SrO.5.6[Al_{0.3}Zn_{0.24}Ti_{0.12}Fe_{1.38}O_3]$ | 280 | 2000 |
| 36 | $SrO.5.8[Al_{0.2}Zn_{0.24}W_{0.06}Fe_{1.64}O_3]$ | 380 | 1500 |
| 37 | $BaO.6[Al_{0.35}Sn_{0.06}Ni_{0.012}Fe_{1.49}O_3]$ | 350 | 2500 |
| 38 | $BaO.6[Al_{0.3}Sn_{0.12}Fe_{1.54}O_3]$ | 350 | 2000 |
| 39 | $BaO.5.8[Al_{0.2}Sn_{0.21}Fe_{1.52}O_3]$ | 350 | 1600 |
| 40 | $SrO.5.6[Al_{0.3}Rh_{0.24}Fe_{1.46}O_3]$ | 300 | 3000 |
| 41 | $PbO.5.6[Al_{0.2}Sn_{0.24}Fe_{1.48}O_3]$ | 330 | 1500 |
| 42 | $BaO.5.6[Al_{0.2}Cr_{0.12}Fe_{1.68}O_3]$ | 350 | 4000 |
| 43 | $BaO.5.7[Al_{0.3}Rh_{0.1}Fe_{1.6}O_3]$ | 350 | 4000 |
| 44 | $BaO.5.2[Al_{0.2}Cr_{0.2}Fe_{1.6}O_3]$ | 340 | 4000 |
| 45 | $BaO.5.6[Al_{0.2}Zn_{0.24}Mn_{0.12}Fe_{1.48}O_3]$ | 310 | 2000 |
| 46 | $BaO.5.5[Al_{0.12}Rh_{0.2}Fe_{1.68}O_3]$ | 350 | 3500 |

-continued

| Example No. | Composition of target | Tc (°C.) | Hc (Oersted) |
|---|---|---|---|
| 47 | $SrO.5.7[Al_{0.2}Ti_{0.06}Co_{0.12}Fe_{1.64}O_3]$ | 370 | 2000 |
| 48 | $SrO.5.7[Al_{0.3}Rh_{0.1}Fe_{1.6}O_3]$ | 350 | 3500 |
| 49 | $SrO.5.7[Al_{0.2}Cr_{0.2}Fe_{1.6}O_3]$ | 340 | 4500 |
| 50 | $SrO.5.6[Al_{0.2}Zn_{0.12}Mn_{0.06}Fe_{1.64}O_3]$ | 380 | 2000 |
| 51 | $PbO.5.5[Al_{0.2}Rh_{0.1}Fe_{1.7}O_3]$ | 380 | 3500 |
| 52 | $PbO.6[Al_{0.2}Ir_{0.06}Cu_{0.12}Fe_{1.64}O_3]$ | 370 | 2000 |
| 53 | $PbO.5.6[Al_{0.2}Ge_{0.06}Ni_{0.12}Fe_{1.64}O_3]$ | 370 | 1000 |
| 54 | $PbO.5.7[Al_{0.2}Ru_{0.2}Fe_{1.64}O_3]$ | 350 | 3500 |
| 55 | $PbO.5.8[Al_{0.2}Zn_{0.12}V_{0.06}Fe_{1.64}O_3]$ | 360 | 1000 |
| 56 | $Ba_{0.75}Sr_{0.25}O.6$ $[Al_{0.35}In_{0.15}Fe_{1.5}O_3]$ | 330 | 2000 |
| 57 | $Ba_{0.75}Sr_{0.25}O.6$ $[Al_{0.35}Ti_{0.15}Fe_{1.45}O_3]$ | 330 | 2000 |
| 58 | $Ba_{0.75}Sr_{0.25}O.6$ $[Al_{0.35}Sc_{0.15}Fe_{1.5}O_3]$ | 320 | 2000 |
| 59 | $Ba_{0.75}Sr_{0.25}O.6$ $[Al_{0.2}Zn_{0.24}Sn_{0.12}Fe_{1.48}O_3]$ | 270 | 1000 |
| 60 | $Ba_{0.75}Sr_{0.25}O.6$ $[Al_{0.3}Zn_{0.12}Ti_{0.06}Fe_{1.54}O_3]$ | 300 | 1200 |
| 61 | $PbO.6[Al_{0.2}In_{0.1}Fe_{1.7}O_3]$ | 370 | 3500 |
| 62 | $PbO.6[Al_{0.3}Ti_{0.15}Fe_{1.5}O_3]$ | 330 | 1500 |
| 63 | $PbO.6[Al_{0.3}Sc_{0.1}Fe_{1.6}O_3]$ | 350 | 1500 |
| 64 | $PbO.6[Al_{0.3}Zn_{0.21}Fe_{1.56}O_3]$ | 330 | 1000 |
| 65 | $PbO.6[Al_{0.3}Zn_{0.12}Sn_{0.06}Fe_{1.54}O_3]$ | 330 | 1000 |
| 66 | $PbO.5.5[Al_{0.3}In_{0.2}Fe_{1.5}O_3]$ | 320 | 1000 |
| 67 | $PbO.5.5[Al_{0.2}Ti_{0.18}Fe_{1.56}O_3]$ | 370 | 1000 |
| 68 | $PbO.5.8[Al_{0.3}Sc_{0.1}Fe_{1.6}O_3]$ | 350 | 1500 |
| 69 | $PbO.5.8[Al_{0.2}Zn_{0.21}Fe_{1.66}O_3]$ | 350 | 1000 |
| 70 | $BaO.6[Al_{0.2}Ir_{0.1}Fe_{1.7}O_3]$ | 380 | 2000 |
| 71 | $BaO.6[Al_{0.2}Ta_{0.12}Fe_{1.64}O_3]$ | 370 | 1500 |
| 72 | $BaO.6[Al_{0.2}Ge_{0.12}Fe_{1.64}O_3]$ | 370 | 2000 |

Next, each of the thus obtained magneto optical recording mediums was magnetized in one direction by applying a magnetic field of 10K oersted perpendicular to the surface of each recording medium. In succession, recording was carried out by radiating a semi-conductor laser beam having an output of 20 mW from the substrate side under the condition of luminous intensity on the recording medium surface: 10 mW and at a pulse of frequency: 1 MHz, while impressing a magnetic field of 0.5K oersted opposite to said magnetized direction, for magnetic inversion. On every recording medium, there was formed a recorded bit having a diameter of about 1.5 μm.

EXAMPLE 73

A 2000 Å-thick ZnO film was formed on a monocrystal Si wafer substrate through 1 hour's sputtering using ZnO under the conditions of atmospheric oxygen pressure $2 \times 10^{-3}$ Torr and substrate temperature: 400° C., and same was subjected to 2 hours sputtering using $MnO_{0.6}ZnO_{0.4}Fe_2O_3$ under the conditions of atmospheric gas pressure: $2 \times 10^{-3}$ Torr ($P_{Ar}/P_{O2}=1.8/0.2 \times 10^{-3}$ torr) and substrate temperature: 450° C., to thereby form thereon a 5000 Å-thick $MnO_{0.6}ZnO_{0.4}Fe_2O_3$ film. The same was subjected to 2 hours' sputtering using a magnetic target $BaO.6[Al_{0.05}In_{0.05}Fe_{1.9}O_3]$ under the conditions of atmospheric gas pressure: $2 \times 10^{-3}$ Torr ($O_2/Ar$ ratio=1/6) and substrate temperature: 600° C. to thereby adhere a 2000 Å-thick magnetic film. Thus, there was obtained a perpendicular magnetic recording medium. Recording was carried out using a ferrite ring head (the winding number N=50 T) having a gap width 0.4 μm under the condition of relative speed between the medium and the head=1.51 m/s. The thus obtained recording density $D_{50}$ was 45.0 K FRPI.

EXAMPLE 74

A perpendicular magnetic recording medium was prepared according to the exactly same procedure as in Example 74 except that alumina was used as the substrate material $SrO.6[Al_{0.08}Ti_{0.03}Co_{0.06}Fe_{1.84}O_3]$ was used as the magnetic target and the substrate temperature was 620° C. This recording medium was found to have a recording density: $D_{50}=37.0$ K FRPI.

We claim:

1. A magneto optical recording medium comprising a recording layer of a metal oxide magnetic substance represented by the general formula I:

$$MeO.n[Al_X M_Y Fe_{2-X-(m/3)Y}O_3] \quad (I)$$

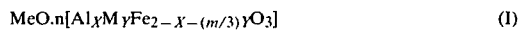

wherein, Me is at least one member of Ba, Sr and Pb, M is at least one member of Zn, Sc, In, Cr, Ir, Ru, Rh, Ti, Ta, Sn and Ge, $5 < n \leq 6$, $0 < X \leq 0.8$, $0 < Y \leq 0.6$, and m is the ionic valency of M.

2. A recording medium according to claim 1, wherein said metal oxide further contains at least one member of Ni, Cu, Sb, Bi, Co, Mo, Nb, Pd, Mn, Yb, V, Te, Zr, Tc, Pt, Os, Re and W.

3. A magneto optical recording medium which comprises, on a substrate, a magnetic film consisting of a metal oxide magnetic substance represented by the general formula I:

$$MeO.n[Al_X M_Y Fe_{2-X-(m/3)Y}O_3] \quad (I)$$

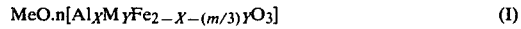

wherein, Me is at least one member of Ba, Sr and Pb, M is at least one member of Zn, Sc, In, Cr, Ir, Ru, Rh, Ti, Ta, Sn and Ge, $5 < n \leq 6$, $0 < X \leq 0.8$, $0 < Y \leq 0.6$, and m is the ionic valency of M.

4. A recording medium according to claim 3, wherein said metal oxide magnetic substance further contains at least one member of Ni, Cu, Sb, Bi, Co, Mo, Nb, Pd, Mn, Yb, V, Te, Zr, Tc, Pt, Os, Re and W.

5. A recording medium according to claim 3, wherein said magnetic film has a thickness of 0.1-10 μm.

6. A magneto optical recording medium which comprises a substrate, a magnetic layer, formed on said substrate, which is consisted of a metal oxide magnetic substance represented by the general formula I:

$$MeO.n[Al_X M_Y Fe_{2-X-(m/3)Y}O_3] \quad (I)$$

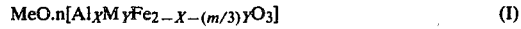

wherein, Me is at least one member of Ba, Sr and Pb, M is at least one member of Zn, Sc, In, Cr, Ir, Ru, Rh, Ti, Ta, Sn and Ge, $5 < n \leq 6$, $0 < X \leq 0.8$, $0 < Y \leq 0.6$, and m is the ionic valency of M, and a reflective film formed on said magnetic layer.

7. A recording medium according to claim 6, wherein said metal oxide magnetic substance further contains at least one member of Ni, Cu, Sb, Bi, Co, Mo, Nb, Pd, Mn, Yb, V, Te, Zr, Tc, Pt, Os, Re and W.

8. A recording medium according to claim 6, wherein said magnetic film is 0.1-10 μm thick and said reflective film is 500-10,000 Å thick.

9. A magneto optical recording medium which comprises, on a substrate, a magnetic film consisting of a metal oxide magnetic substance represented by the general formula I:

$$MeO.n[Al_X M_Y Fe_{2-X-(m/3)Y}O_3] \quad (I)$$

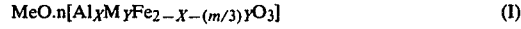

wherein, Me is at least one member of Ba, Sr and Pb, M is at least one member of Zn, Sc, In, Cr, Ir, Ru, Rh, Ti, Ta, Sn and Ge, $5 < n \leq 6$, $0 < X \leq 0.8$, $0 < Y \leq 0.6$, and m is the ionic valency of M, a guide track layer, a reflective film and a protective film in the order named.

10. A recording medium according to claim 9, wherein said metal oxide magnetic substance further contains at least one member of Ni, Cu, Sb, Bi, Co, Mo, Nb, Pd, Mn, Yb, V, Te, Zr, Tc, Pt, Os, Re and W.

11. A recording medium according to claim 9, wherein said magnetic film is 0.1–10 μm thick, said reflective film is 500–10,000 Å thick, and said protective film is 0.1–100 μm thick.

12. A magneto optical recording medium which comprises, on a substrate equipped with a guide track, a reflective film, a transparent adhesive layer, a magnetic film consisting of a metal oxide magnetic substance represented by the general formula I:

$$MeO \cdot n[Al_X M_Y Fe_{2-X-(m/3)Y} O_3] \quad (I)$$

wherein, Me is at least one member of Ba, Sr and Pb, M is at least one member of Zn, Sc, In, Cr, Ir, Ru, Rh, Ti, Ta, Sn and Ge, $5 < n \leq 6$, $0 < X \leq 0.8$, $0 < Y \leq 0.6$, and m is the ionic valency of M), and a heat-resisting layer in the order named.

13. A recording medium according to claim 12, wherein said metal oxide magnetic substance further contains at least one member of Ni, Cu, Sb, Bi, Co, Mo, Nb, Pd, Mn, Yb, V, Te, Zr, Tc, Pt, Os, Re and W.

14. A recording medium according to claim 12, wherein said reflective film is about 500–10,000 Å thick, said transparent adhesive layer is about 0.1–10 μm thick, said magnetic film is about 0.1–10 μm thick and said heat-resisting layer is about 0.1–2 mm thick.

15. A magneto optical reocrding medium comprising a film of a metal oxide magnetic substance represented by the general formula I:

$$MeO \cdot n[Al_X M_Y Fe_{2-X-(m/3)Y} O_3] \quad (I)$$

wherein, Me is at least one member of Ba, Sr and Pb, M is at least one member of Zn, Sc, In, Cr, Ir, Ru, Rh, Ti, Ta, Sn and Ge, $5 < n \leq 6$, $0 < X \leq 0.8$, $0 < Y \leq 0.6$, and m is the ionic valency of M.

16. A magneto optical recording medium according to claim 15 wherein optically readable magnetic information is encoded in said film.

17. A magneto optical recording medium according to claim 15 which is magnetized perpendicularly to its plane for use as a perpendicular magneto optical recording medium.

18. A magneto optical recording medium according to claim 15, wherein said metal oxide magnetic substance further contains at leats one member of Ni, Cu, Sb, Bi, Co, Mo, Nb, Pd, Mn, Yb, V, Te, Zr, Tc, Pt, Os, Re and W.

19. A magneto optical recording medium which comprises on a substrate, a magnetic film consisting of a metal oxide magnetic substance represented by the general formula I:

$$MeO \cdot n[Al_X M_Y Fe_{2-X-(m/3)Y} O_3] \quad (I)$$

wherein, Me is at least one member of Ba, Sr and Pb, M is at least one member of Zn, Sc, In, Cr, Ir, Ru, Rh, Ti, Ta, Sn and Ge, $5 \leq n \leq 6$, $0 < X \leq 0.8$, $0 < Y \leq 0.6$, and m is the ionic valency of M, a transparent dielectric layer and a reflective film in the order named.

20. A recording medium according to claim 19, wherein said metal oxide magnetic substance further contains at least one member of Ni, Cu, Sb, Bi, Co, Mo, Nb, Pd, Mn, Yb, V, Te, Zr, Tc, Pt, Os, Re and W.

21. A recording medium according to claim 20, wherein said magnetic film is 0.1–10 μm thick, said transparent dielectric layer is 0.05–0.5 μm, and said reflective film is 500–10,000 Å thick.

* * * * *